United States Patent [19]

Enomoto et al.

[11] Patent Number: 5,175,784
[45] Date of Patent: * Dec. 29, 1992

[54] SECOND HARMONIC WAVE GENERATING DEVICE

[75] Inventors: Ryo Enomoto; Masaya Yamada, both of Gifu, Japan

[73] Assignee: Ibiden Co., Ltd., Ogaki, Japan

[ * ] Notice: The portion of the term of this patent subsequent to Nov. 27, 2007 has been disclaimed.

[21] Appl. No.: 589,210

[22] Filed: Sep. 28, 1990

Related U.S. Application Data

[60] Continuation-in-part of Ser. No. 564,562, Aug. 9, 1990, Pat. No. 5,018,810, which is a division of Ser. No. 452,410, Dec. 19, 1989, Pat. No. 4,973,118.

[51] Int. Cl.⁵ ............................... G02F 1/37
[52] U.S. Cl. ................... 385/122; 359/328; 359/332
[58] Field of Search ............ 385/122; 359/326–332

[56] References Cited

U.S. PATENT DOCUMENTS

| | | | |
|---|---|---|---|
| 3,586,872 | 6/1971 | Tien | 307/88.3 |
| 4,953,943 | 9/1990 | Miyazaki et al. | 359/328 |
| 4,973,118 | 11/1990 | Enomoto et al. | 359/328 |
| 5,018,810 | 5/1991 | Enomoto et al. | 359/328 |

FOREIGN PATENT DOCUMENTS 0364214 4/1990 European Pat. Off.
58-117510 7/1983 Japan.

OTHER PUBLICATIONS

Robert D. Burbgan; Donald R. Scifres; William Streifer; and Wolfgang Stutius Xerox Disclosure Journal; Achieving Efficient SHG in Thin Film Waveguides by Adjustment of Waveguide Thickness, May/Jun. 1979, vol. 4, pp. 349 and 350.

M. DeMicheli, Journal of Optical Communications, vol. 4 (1983) Mar., No. 1, Berlin, Deutschland, pp. 25-31.

Primary Examiner—John D. Lee
Attorney, Agent, or Firm—Sherman and Shalloway

[57] ABSTRACT

A second harmonic wave generating device having a thin film waveguide layer formed on a substrate, wherein the thin film wave guide layer is formed by dry etching a thin film formed on the substrate to adjust the thickness of the thin film so as to satisfy the following Equation (A) or (B):

$$\text{when } \frac{(n_{OF1} - n_{OS1})}{(n_{eF2} - n_{eS2})} > 2 \quad \text{(A)}$$

$$0.02 \leq \frac{(\lambda + 0.1) N_1}{\lambda^3 T} \leq 6.0$$

or $$\text{when } \frac{(n_{OF1} - n_{OS1})}{(n_{eF2} - n_{eS2})} \leq 2 \quad \text{(B)}$$

$$0.05 \leq \frac{(\lambda + 0.1) N_2}{\lambda^3 T} \leq 5.0$$

wherein,
T$\mu$m: a thickness of the thin film waveguide layer
$\lambda\mu$m: a fundamental laser wavelength
$n_{OS1}$: an ordinary refractive index of the substrate at the fundamental wavelength ($\lambda\mu$m)
$n_{OF1}$: an ordinary refractive index of the thin film waveguide layer at the fundamental wavelength ($\lambda\mu$m)
$n_{eS2}$: an extraordinary refractive index of the substrate at a second harmonic wavelength ($\lambda\mu$m/2)
$n_{eF2}$: an extraordinary refractive index of the thin film waveguide layer at the second harmonic wavelength ($\lambda\mu$m/2)
$N_1$ in Equation (A) is $$N_1 = \frac{(n_{eF2} - n_{eS2})}{(n_{OF1} - n_{eS2})}$$

and $N_2$ in Equation (B) is $$N_2 = \frac{(n_{eF2} - n_{eS2})}{(n_{OF1} - n_{OS1})}$$

6 Claims, 1 Drawing Sheet

SECOND HARMONIC WAVE GENERATING DEVICE

This application is a continuation-in-part application of Divisional application Ser. No. 07/564,562, filed Aug. 9, 1990, U.S. Pat. No. 5,018,810, which is a division of application Ser. No. 07/452,410 filed Dec. 19, 1989, U.S. Pat. No. 4,973,118.

BACKGROUND OF THE INVENTION

This invention relates to a second harmonic wave generating device (hereinafter referred to as "SHG device") of a thin film waveguide structure with a high conversion efficiency.

A SHG device utilizes nonlinear optical effects of a nonlinear optical crystal material to convert wavelength $\lambda$ of incident laser light to wavelength $\frac{1}{2}\lambda$, which is outputted. Since the output light has a half wavelength of incident light, the device can be used in an optical disc memory and CD player to achieve a 4-times increase in recording density, and can be used in a laser printer and photolithography with enhanced resolution.

Heretofore, a bulk single crystal of a nonlinear optical material using a high-output-power gas laser as a light source has been used as a SHG device. However, with recent increases in demand for compact optical disc systems and laser printers and since gas laser requires an external modulator for optical modulation and is not suited for compact design, a SHG device that enables use of a semiconductor laser, which can be directly modulated and is lower in cost and easier to handle than gas laser, has been in demand.

When a semiconductor laser is used as a light source, since the semiconductor laser has a low output power of several mW to several ten mW, a SHG device of a thin film waveguide structure which has a particularly high conversion efficiency has been required.

Generation of second harmonic optical wave using a thin film waveguide has advantages that: (1) energy of light concentrated on the thin film can be utilized, (2) since optical wave is confined within the thin film and does not diffuse, interaction is possible over a long distance, and (3) a substance, which cannot make phase matching in the bulk state, becomes able to make phase matching by utilizing mode dispersion of thin film (Miyama and Miyazaki; Technical Report of the Electronic Communication Society, OQE75-6 (1975), Miyazaki, Hoshino, and Akao; Proceedings of Electromagnetic Field Theory Research Conference, EMT-78-5 (1978)).

However, in order to obtain a SHG device of a thin film waveguide structure, it has heretofore been necessary to conduct experiments with substrates of different materials and thin film waveguide layers of different materials and thicknesses at an objective fundamental wavelength to find conditions for generation of a second harmonic wave and to determine the structure, thus requiring very inefficient work.

The inventors have conducted intensive studies and have found that a second harmonic wave can be generated very efficiently by satisfying a specific relation of a fundamental wavelength ($\lambda$ $\mu$m), a thickness (T $\mu$m) of the thin film waveguide layer, an ordinary refractive index ($n_{OS1}$) of the substrate at the fundamental wavelength ($\lambda$ $\mu$m), an ordinary refractive index ($n_{OF1}$) of the thin film waveguide layer at the fundamental wavelength ($\lambda$ $\mu$m), an extraordinary refractive index ($n_{eS2}$) of the substrate at a second harmonic wavelength ($\lambda$ $\mu$m/2), and an extraordinary refractive index ($n_{eF2}$) of the thin film waveguide layer at the second harmonic wavelength ($\lambda$ $\mu$m/2), thus accomplishing the present invention.

Heretofore, in the fabrication of a SHG device, the thickness of the thin film waveguide has been adjusted by optically polishing the film. Through intensive studies the inventors have found that a dry etching technique is most suitable as a processing method which is more simple than dry etching and enables a low surface roughness and a uniform film thickness.

Summary of the Invention

In accordance with the present invention, there is provided a method for producing a second harmonic wave generating device having a thin film waveguide layer formed on a substrate, comprising forming a thin film on the substrate and dry etching the thin film, whereby the thickness of the thin film is adjusted to form a thin film waveguide layer which satisfies the following Equation (A) or (B):

$$\text{when } \frac{(n_{OF1} - n_{OS1})}{(n_{eF2} - n_{eS2})} > 2 \quad \text{(A)}$$

$$0.02 \leq \frac{(\lambda + 0.1) N_1}{\lambda^3 T} \leq 6.0$$

or $$\text{when } \frac{(n_{OF1} - n_{OS1})}{(n_{eF2} - n_{eS2})} \leq 2 \quad \text{(B)}$$

$$0.05 \leq \frac{(\lambda + 0.1) N_2}{\lambda^3 T} \leq 5.0$$

wherein,

T $\mu$m: a thickness of the thin film waveguide layer
$\lambda$ $\mu$m: a fundamental laser wavelength
$n_{OS1}$: an ordinary refractive index of the substrate at the fundamental wavelength ($\lambda$ $\mu$m)
$n_{OF1}$: an ordinary refractive index of the thin film waveguide layer at the fundamental wavelength ($\lambda$ $\mu$m)
$n_{eS2}$: an extraordinary refractive index of the substrate at a second harmonic wavelength ($\lambda$ $\mu$m/2)
$n_{eF2}$: extraordinary refractive index of the thin film waveguide layer at the second harmonic wavelength ($\lambda$ $\mu$m/2)
$N_1$ in Equation (A) is $$N_1 = \frac{(n_{eF2} - n_{eS2})}{(n_{OF1} - n_{eS2})}$$

and $N_2$ in Equation (B) is $$N_2 = \frac{(n_{eF2} - n_{eS2})}{(n_{OF1} - n_{OS1})}$$

There is provided according to the present invention a second harmonic wave generating device having a thin film waveguide layer formed on a substrate, characterized in that the thin film wave guide layer is formed by dry etching a thin film formed on the substrate to adjust the thickness of the thin film so as to satisfy the following Equation (A) or (B):

when $\frac{(n_{OF1} - n_{OS1})}{(n_{eF2} - n_{eS2})} > 2$ (A)

$$0.02 \leq \frac{(\lambda + 0.1) N_1}{\lambda^3 T} \leq 6.0$$

or when $\frac{(n_{OF1} - n_{OS1})}{(n_{eF2} - n_{eS2})} \leq 2$ (B)

$$0.05 \leq \frac{(\lambda + 0.1) N_2}{\lambda^3 T} \leq 5.0$$

wherein,
T μm: a thickness of the thin film waveguide layer
λ μm: a fundamental laser wavelength
$n_{OS1}$: an ordinary refractive index of the substrate at the fundamental wavelength (λ μm)
$n_{OF1}$: an ordinary refractive index of the thin film waveguide layer at the fundamental wavelength (λ μm)
$n_{eS2}$: an extraordinary refractive index of the substrate at a second harmonic wavelength (λ μm/2)
$n_{eF2}$: an extraordinary refractive index of the thin film waveguide layer at the second harmonic wavelength (λ μm/2)
$N_1$ in Equation (A) is $$N_1 = \frac{(n_{eF2} - n_{eS2})}{(n_{OF1} - n_{eS2})}$$

and $N_2$ in Equation (B) is $$N_2 = \frac{(n_{eF2} - n_{eS2})}{(n_{OF1} - n_{OS1})}$$

DETAILED DESCRIPTION OF THE INVENTION

The inventive SHG device comprising a substrate and a thin film waveguide layer formed on the substrate, which has a structure that satisfies the above Equation (A) or (B) of the ordinary refractive indices to a fundamental wave and the extraordinary refractive indices to a second harmonic wave of the substrate and the thin film waveguide layer, and of the thickness of the thin film waveguide layer, can generate the second harmonic wave of a specific fundamental wavelength.

The inventive SHG device must have a thin film waveguide layer formed on a substrate.

This is not only because generation of the second harmonic wave in the SHG device which has the thin film waveguide layer formed on the substrate has the advantages that the energy of light concentrated on the thin film can be utilized and, since the optical wave is confined within the thin film and does not diffuse, interaction can be made over a long distance, but also because phase matching is possible by mode dispersion of the thin film, even using a substance which cannot make phase matching when used in a bulk single crystal in a prior art SHG device.

In the inventive SHG device, the fundamental wavelength (λ μm), the thickness (T μm) of the thin film waveguide layer, the ordinary refractive index ($n_{OS1}$) of the substrate at the fundamental wavelength (λ μm), the ordinary refractive index ($n_{OF1}$) of the thin film waveguide layer at the fundamental wavelength (λ μm), the extraordinary refractive index ($n_{eS2}$) of the substrate at the second harmonic wavelength (λ μm/2), and the extraordinary refractive index ($n_{eF2}$) of the thin film waveguide layer at the second harmonic wavelength (λμm/2) are required to satisfy the equation when $\frac{(n_{OF1} - n_{OS1})}{(n_{eF2} - n_{eS2})} > 2$ (A)

$$0.02 \leq \frac{(\lambda + 0.1) N_1}{\lambda^3 T} \leq 6.0$$

or when $\frac{(n_{OF1} - n_{OS1})}{(n_{eF2} - n_{eS2})} \leq 2$ (B)

$$0.05 \leq \frac{(\lambda + 0.1) N_2}{\lambda^3 T} \leq 5.0$$

wherein,
$N_1$ in Equation (A) above is $$N_1 = \frac{(n_{eF2} - n_{eS2})}{(n_{OF1} - n_{eS2})}$$

and $N_2$ in Equation (B) above is $$N_2 = \frac{(n_{eF2} - n_{eS2})}{(n_{OF1} - n_{OS1})}$$

This is because, in the SHG device comprising the thin film waveguide layer formed on the substrate, the conversion efficiency to the second harmonic wavelength is so low that cannot be used in practical use, unless the structure of the device satisfies either Equation (A) or Equation (B).

In particular, in order to obtain a high conversion efficiency to the second harmonic wavelength, it is preferable that the fundamental wavelength (λ μm), the thickness (T μm) of the thin film waveguide layer, the ordinary refractive index ($n_{OS1}$) of the substrate at the fundamental wavelength (λ μm), the ordinary refractive index ($n_{OF1}$) of the thin film waveguide layer at the fundamental wavelength (λ μm), the extraordinary refractive index ($n_{eS2}$) of the substrate at the second harmonic wavelength (λ μm/2), and the extraordinary refractive index ($n_{eF2}$) of the thin film waveguide layer at the second harmonic wavelength (λ μm/2), when $\frac{(n_{OF1} - n_{OS1})}{(n_{eF2} - n_{eS2})} > 2$ satisfy Equation (A') below, and it is particularly advantageous to satisfy Equation (A'') below.

$$0.1 \leq \frac{(\lambda + 0.1) N_1}{\lambda^3 T} \leq 3.0 \quad (A')$$

$$0.2 \leq \frac{(\lambda + 0.1) N_1}{\lambda^3 T} \leq 1.2 \quad (A'')$$

wherein, $N_1$ in Equation (A') and Equation (A'') above is $$N_1 = \frac{(n_{eF2} - n_{eS2})}{(n_{0F1} - n_{eS2})}$$

On the other hand, when $$\frac{(n_{0F1} - n_{0S1})}{(n_{eF2} - n_{eS2})} \leq 2$$

it is preferably to satisfy Equation (B') below, and it is particularly advantageous to satisfy Equation (B") below.

$$0.2 \leq \frac{(\lambda + 0.1) N_2}{\lambda^3 T} \leq 3.0 \quad (B')$$

$$0.4 \leq \frac{(\lambda + 0.1) N_2}{\lambda^3 T} \leq 1.0 \quad (B'')$$

wherein, $N_2$ in Equation (B') and Equation (B") above is $$N_2 = \frac{(n_{eF2} - n_{eS2})}{(n_{0F1} - n_{0S1})}$$

The thin film waveguide layer of the inventive SHG device is required to be formed by dry etching a film formed on the substrate.

This is because the dry etching technique has a good repeatability of etching rate and has a processing precision over the 1 μm level.

Dry etching techniques include ion beam etching, plasma etching, and reactive ion beam etching, and the ion beam etching is particularly preferable.

The ion beam etching uses a plasma generated a filament or ECR (electron cyclotron resonance), which is irradiated as an ion beam to etch a material to be processed.

The ion beam etching not only is able to reduce the etching rate to 0.01 to 0.001 μm/hr, but also has a good repeatability, and gives almost no damages to the material being processed.

It is particularly preferable that the processing precision of the film thickness (T μm) be ±0.01 to ±0.05 μm, and the ion beam etching is the most suitable as a processing method which allows such high-precision processing and does not deteriorate the optical characteristics of the thin film waveguide layer.

The most preferable SHG device according to the present invention has a thickness of the thin film waveguide layer formed on the substrate adjusted by dry etching to 96.3 to 103.9% the phase matching film thickness.

The reason why it is preferable to adjust the thickness of the thin film waveguide layer to 96.3 to 103.9% the phase matching film thickness is that the film thickness within the range gives the highest SHG conversion efficiency.

It is preferable that the thickness of the thin film waveguide layer be 98.2 to 102.0% to a specific film thickness (T μm), more preferably 99.2 to 100.8%.

In the inventive SHG device, it is preferable that incident angle (θ) of the fundamental wave to the optical axis (Z-axis) of the thin film waveguide layer is within the range 0°±15° or 90°±15°.

This is because, when the incident angle (θ) of the fundamental wave is within the above range, the conversion efficiency to the second harmonic is extremely high. It is particularly advantageous that the incident angle of the fundamental wave is within the range 0°±5° or 90°±5°.

Wavelength (λ) of the fundamental wave incident to the inventive SHG device is preferably 0.4 to 1.6 μm.

This is because, although a shorter wavelength is more advantageous as the fundamental wavelength (λ), generation by a semiconductor laser of laser wave shorter in wavelength than 0.4 μm is substantially difficult and, when a fundamental wave longer in wavelength than 1.6 μm is used, since the obtained second harmonic wavelength is ½ the fundamental wavelength, it is within a wavelength range that can be easily generated directly by a semiconductor laser, which has no advantages of use of the SHG device. It is advantageous that the wavelength (λ) of the fundamental wave is 0.6 to 1.3 μm which is relatively easy to obtain a semiconductor laser light source and, in particular, 0.68 to 0.94 μm is practically preferable.

The inventive SHG device preferably has a thickness (T) of the thin film waveguide layer of 0.1 to 20 μm.

This is because, when the thickness (T) of the thin film waveguide layer is smaller than 0.1 μm, it is difficult to apply the fundamental wave and, due to a low incident efficiency, it is difficult to obtain a substantially high SHG conversion efficiency. On the other hand, when the thickness (T) is greater than 20 μm, it has a low optical power density and hence a low SHG conversion efficiency. Either case is undesirable for a SHG device. It is particularly advantageous that the thin film waveguide layer has a thickness of 0.5 to 10 μm, and a thickness of 1 to 8 μm is practically preferable.

A variety of optical materials can be used in the substrate and thin film waveguide layer used in the present invention; the thin film waveguide layer can be made of, for example, $LiNbO_3$, α-quartz, $KTiOPO_4$ (KTP), β-$BaB_2O_4$ (BBO), $KB_5O_8 \cdot 4H_2O$ (KB5), $KH_2PO_4$ (KDP), $KD_2PO_4$ (KD*P), $NH_4H_2PO_4$ (ADP), $C_5H_2AsO_4$ (CDA), $C_5D_2AsO_4$ (CD*A), $RbH_2PO_4$ (RDP), $RbH_2AsO_4$ (RDA), $BeSO_4 \cdot 4H_2O$, $LiClO_4 \cdot 3H_2O$, $LiIO_3$, α-$LiCdBO_3$, $LiB_3O_5$ (LBO), urea, poly-p-nitroaniline (p-PNA), poly-diacetylene (DCH), 4-(N,N-dimethylamino)-3-acetamidonitrobenzene (DAN), 4-nitrobenzaldehyde-hydrazine (NBAH), 3-methoxy-4-nitrobenzaldehyde-hydrazine, 2-methyl-4-nitroaniline (MNA), or the like; and the substrate can be made of, for example, $LiTaO_3$, $LiNbO_3$ formed with a $LiTaO_3$ thin film, $SiO_2$, alumina, KTP, BBO, LBO, KDP, or the like, soda glass, borosilicate glass, polymethylmethacrylate (PMMA), or the like.

These materials for the substrate and the thin film waveguide layer can be combined with a different element such as Na, Cr, Mg, Nd, Ti or the like to adjust their refractive indices.

The addition of Na, Cr, Nd, Ti or the like can increase the refractive indices of the thin film waveguide layer and the substrate, and the addition of Mg, V or the like can decrease the refractive index of the thin film waveguide layer and the substrate.

Such a different element as Na, Cr, Mg, Nd, Ti, V or the like is added preferably using the procedure, in which the raw material and the impurity are previously mixed, and the thin film waveguide layer is formed on the substrate by such as a LPE (liquid phase epitaxial) technique, or, a diffusion technique is used to diffuse an impurity such as Na, Mg, Nd, Ti, V or the like into the substrate or the thin film waveguide layer.

Material combinations of thin film waveguide layer/substrate suitable for use in the inventive SHG device include LiNbO$_3$/LiTaO$_3$, 2-methyl-4-nitroaniline (MNA)/alumina; KTiOPO$_4$ (KTP)/alumina, $\beta$-BaB$_2$O$_4$ (BBO)/alumina; 4-(N,N-dimethylamino)-3-acetamidonitrobenzene (DAN)/SiO$_2$; 4-(N,N-methylamino)-3-acetamidonitrobenzene (DAN)/polymethylmethacrylate (PMMA); LiB$_3$O$_5$ (LBO)/BBO; LBO/alumina; RbH$_2$PO$_4$ (RDP)/KH$_2$PO$_4$ (KDP); and poly-p-nitroaniline (p-PNA)/PMMA.

Above all, a combination of a LiTaO$_3$ single crystal substrate or a LiNbO$_3$ single crystal substrate formed with a LiTaO$_3$ single crystal thin film with LiNbO$_3$ as the thin film waveguide layer is particularly preferable for use in the SHG device of the present invention.

This is because the LiNbO$_3$ is large in nonlinear optical constant and small in optical loss, and can be formed into a uniform thin film, and LiTaO$_3$ is similar in crystal structure to the LiNbO$_3$, easy to form a thin film of LiNbO$_3$ on it, and easy to obtain a high-quality, inexpensive crystal.

When a LiNbO$_3$ single crystal substrate formed with a LiTaO$_3$ single crystal thin film is used as the substrate, it is preferable that the LiNbO$_3$ single crystal substrate is of an optical grade.

The optical-grade LiNbO$_3$ single crystal substrate refers to one which has contents of impurities such as iron of 2 ppm or less, a refractive index distribution of $10^{-4}$/cm (locally $\leq 10^{-5}$), and a raw material purity of 99.999% or higher.

The reason why the single crystal substrate is preferably of an optical grade is that, by forming a LiTaO$_3$ single crystal thin film on an optical-grade LiNbO$_3$ single crystal substrate, crystallinity of the LiNbO$_3$ single crystal substrate is transferred to the LiTaO$_3$ single crystal thin film, thereby obtaining an optical-grade LiTaO$_3$ single crystal thin film, and, by forming a LiNbO$_3$ single crystal on the optical-grade LiTaO$_3$ single crystal thin film, the crystallinity of the LiTaO$_3$ single crystal thin film is transferred to the LiNbO$_3$ single crystal, thereby obtaining a thin film waveguide layer with particularly enhanced light transmission, electrooptical effects, and non-linear optical effects.

The LiTaO$_3$ single crystal thin film preferably has a thickness of 0.2 to 30 $\mu$m.

This is because, when the thickness of the LiTaO$_3$ single crystal thin film is smaller than 0.2 $\mu$m, guided light tends to leak, and, when the thin film is thicker than 30 $\mu$m, the crystallinity tends to be lowered.

It is particularly preferable that the LiTaO$_3$ single crystal thin film has a thickness of 0.5 to 10 $\mu$m, and a thickness of 1 to 5 $\mu$m is advantageous.

It is preferable that the thin film waveguide layer and the substrate in the inventive SHG device are individually lattice matched.

The lattice matching is to adjust the lattice constant of the thin film waveguide layer to 99.81 to 100.07% the lattice constant of the substrate.

Such lattice matching allows formation of a thin film with no lattice deflection or micro-cracks.

In the present invention, method for achieving lattice matching is not specifically limited, but, it is advantageously achieved, for a SHG device comprising a LiTaO$_3$ substrate (including a LiNbO$_3$ substrate formed with a LiTaO$_3$ thin film) and a LiNbO$_3$ thin film waveguide layer, by adding a different element to the LiNbO$_3$ thin film waveguide layer to increase the lattice constant, or, to the contrary, by adding a different element to the LiTaO$_3$ substrate to decrease the lattice constant.

The different element added to the LiNbO$_3$ thin film waveguide layer is preferably Na and Mg.

This is because Na and Mg atoms or ions have an effect to increase the lattice constant of LiNbO$_3$ by substitution or solid dissolution to LiNbO$_3$, and thus lattice matching between the LiNbO$_3$ thin film waveguide layer and the LiTaO$_3$ substrate can be achieved by adjusting the composition of Na and Mg.

Mg has an effect to prevent the thin film from being optically damaged, and use of it is advantageous to obtain a high-efficiency SHG output.

Contents of Na and Mg are preferably 0.1 to 4.8 mole % and 0.8 to 10.8 mole %, respectively, to LiNbO$_3$.

This is because, if the Na content is smaller than 0.1 mole %, lattice matching between the LiNbO$_3$ thin film and the LiTaO$_3$ substrate is not achieved regardless of the Mg content, and, if the Na content exceeds 4.8 mole %, the lattice constant tends to become too large. Thus, neither case gives lattice matching between the LiNbO$_3$ thin film and the LiTaO$_3$ substrate.

If the Mg content is smaller than 0.8 mole %, the effect to prevent optical damages tends to be insufficient, and, a Mg content exceeding 10.8 mole % tends to cause deposition of LiMgO$_3$-based crystals, thus such a high content of Mg cannot be added.

It is preferable to use Ti as the different element added to the LiTaO$_3$ substrate.

This is because Ti has an effect to decrease the lattice constant of the LiTaO$_3$ substrate.

The Ti content is preferably 5.0 to 7.0 mole %.

This is because a Ti content out of the above range does not provide lattice matching with the LiTaO$_3$ substrate or the thin film waveguide layer.

Furthermore, it is preferable to form the LiNbO$_3$ thin film on the (0001) surface of the LiTaO$_3$ substrate.

The (0001) surface refers to the surface which is perpendicular to c-axis of the crystal.

The reason why the (0001) surface of the LiTaO$_3$ substrate is used as the growth surface of the LiNbO$_3$ thin film is that the (0001) surface comprises only a-axis, and thus lattice matching is achieved with the LiNbO$_3$ thin film by merely varying the lattice constant of a-axis.

The lattice constant (a-axis) of the LiNbO$_3$ thin film formed on the LiTaO$_3$ substrate is preferably 99.81 to 100.07%, more preferably 99.92 to 100.03%, of the lattice constant (a-axis) of the LiTaO$_3$ substrate.

This is because, if the lattice constant is out of the above range, it is difficult to achieve matching of lattice constant of LiTaO$_3$ and LiNbO$_3$.

When a LiNbO$_3$ substrate formed with a LiTaO$_3$ thin film is used as the LiTaO$_3$ substrate, it is advantageous that the LiTaO$_3$ thin film and the LiNbO$_3$ are lattice matched.

The inventive SHG device is preferably of a channel type waveguide with a width of 1 to 10 $\mu$m. The reason why a SHG device using a channel-type waveguide is advantageous is that this type of device can have a high optical power density over a slab type. The reason why a width of 1 to 10 $\mu$m is advantageous is that a width smaller than 1 $\mu$m is difficult to introduce incident light into the waveguide and low in incident efficiency, resulting in a low SHG conversion efficiency, and, although a larger width has a higher incident efficiency, a width greater than 10 μm is low in optical power density, resulting in a low SHG conversion efficiency.

Of the channel-type SHG devices, a ridge-type SHG device is particularly preferable.

This is because, the ridge-type device is easy to be produced compared with an embedded type, is very efficient in light containment compared with an attachment type, and does not need to remove an unnecessary slab portion as required for a rib type, m charged type, thus reducing the processing time and obtaining a smooth side surface.

In general, the ridge type refers to a configuration in which a slab-type waveguide layer is formed on the substrate, a waveguide pattern portion (channel portion) of the slab-type waveguide layer being formed thicker than other portions.

The ratio of thickness of the waveguide pattern portion/thickness of the slab-type waveguide layer is preferably 1/11 to 1/1.3.

This is because light confinement is difficult when the thickness of the waveguide portion/thickness of the slab-type waveguide layer is smaller than the above range, and it is difficult to guide laser light when the ratio exceeds 1/1.3.

The ratio of thickness of the pattern portion/thickness of the slab-type waveguide layer is preferably ¼ to 1/1.4.

Furthermore, the inventive SHG device preferably has a wavelength selective thin film formed on the incident surface, which has a fundamental laser light transmittance of 100% or close to 100%, and completely or almost does not pass light ranging from 0.6 μm to less than fundamental wavelength.

This is because semiconductor lasers generally emit weak laser light or natural light of peripheral wavelengths other than the central wavelength, and light of these wavelengths is normally unnecessary for the SHG device.

The inventive SHG device preferably comprises a clad layer formed on the thin film waveguide layer.

This is because, by forming the clad layer on the thin film waveguide layer, the clad layer is nearly symmetrical in terms of the refractive index, the field distribution of the fundamental wave and the second harmonic wave light can be rendered symmetrical, and, even if the thickness of the thin film waveguide layer is not exactly equal to the theoretical phase matching thickness, lowering of second harmonic wave light output can be eased, thereby obtaining a SHG device with a wide allowance of phase matching thickness and a high conversion efficiency.

The clad layer can also act as a protective layer to prevent scattering of light due to damages of the waveguide layer or adherence of dust, can completely prevent the waveguide layer from chipping which is a problem with polishing of the end surface, thereby remarkably improving the yield rate of device fabrication.

Furthermore, the clad layer preferably satisfies Equations 1) and 2).

$$n_{OS} - 0.50 \leq n_{OC} \leq n_{OS} - 0.05 \quad \text{Equation 1}$$

$$n_{eS} - 0.70 \leq n_{eC} \leq n_{eS} - 0.15 \quad \text{Equation 2}$$

wherein,
$n_{OS}$: ordinary refractive index of the substrate at the fundamental laser wavelength (λ μm)

$n_{OC}$: ordinary refractive index of the clad layer at the fundamental laser wavelength (λ μm)

$n_{eS}$: extraordinary refractive index of the substrate at the second harmonic wavelength (λ μm/2)

$n_{eC}$: extraordinary refractive index of the clad layer at the second harmonic wavelength (λ μm/2)

Thickness of the clad layer of the inventive SHG device is preferably 0.2 to 30 μm. This is because, if the thickness is smaller than 0.2 μm, guided light will leak through the clad layer, and, if the thickness is greater than 30 μm, crystallinity of the clad layer tends to be lowered resulting in deteriorated optical characteristics, and a longer time is required to form the clad layer, decreasing the productivity.

The clad layer preferably has a thickness of 0.5 to 10 μm, more preferably 1 to 8 μm.

The clad layer in the present invention can be made of various optical materials, for example, ZnO, MgO, $Al_2O_3$, PMMA, $SiO_2$, borosilicate glass, soda glass, or the like, of these material, ZnO is preferable.

The inventive SHG device preferably has an incident surface which is provided with an anti-reflection coating to achieve a fundamental laser transmittance of 100% or close to 100%.

The anti-reflection coating can be made of, for example, such oxides as $SiO_2$, MgO, ZnO, and $Al_2O_3$, such complex oxides as $LiNbO_3$, $LiTaO_3$, $Y_3Ga_5O_{12}$, and $Gd_3Ga_5O_{12}$, or such organic substances as PMMA and MNA, or a multilayered thin film comprising these materials can be used. The coating layer can be formed to good advantage by a sputtering, liquid phase epitaxial, deposition, MBE (molecular beam epitaxial), MOCVD (metal organic chemical deposition), ion plating, LB, spin coating, or dipping method.

The inventive SHG device preferably has a wavelength selective thin film (filter) or a polarizing film formed behind the light output surface or directly on the output surface, which has a second harmonic wave transmittance of 100% or close to 100%, and completely or almost does not pass the fundamental laser light.

This can remove unnecessary fundamental laser light from the output light and efficiently take out only the required second harmonic wave.

Furthermore, by forming the wavelength selective thin film directly on the output surface and adjusting to satisfy the anti-reflection conditions to the second harmonic wave, reflection loss at the output surface due to a large difference in refractive index between the lithium niobate single crystal thin film and air, thereby enhancing the SHG output.

The wavelength-selective thin film may be either formed at a position behind and away from the output surface or fixed onto the output surface with an appropriate adhesive.

When the thin film is fixed onto the output surface with an adhesive, it is preferable that the refractive index and thickness of the adhesive be adjusted to meet the anti-reflection conditions for the second harmonic wave in order to enhance the SHG output.

As the wavelength-selective thin film can be used a colored glass filter, a wavelength-selective interference film coated on a glass substrate, or the like.

The wavelength-selective thin film can be made of such oxides as $SiO_2$, MgO, ZnO, $Al_2O_3$ or the like, such complex oxides as $LiNbO_3$, $LiTaO_3$, $Y_3Ga_5O_{12}$, and $Gd_3Ga_5O_{12}$, or such organic substances as PMMA and MNA, or a multilayered thin film comprising these materials can be used.

The wavelength-selective thin film can be formed by a sputtering, liquid phase epitaxial, deposition, MBE (molecular beam epitaxial), MOCVD (metal organic chemical deposition), ion plating, LB, spin coating, or dipping method.

The inventive SHG device is preferably formed in a single chip by bonding with a semiconductor laser bare chip, so that laser light is incident to the thin film waveguide layer of the SHG device.

This configuration comprises a channel-type SHG device and a semiconductor laser device mounted onto the block, the block being bonded to the substrate of the channel-type SHG device so that the light-emitting end surface (from which laser light is emitted) of the semiconductor laser device is positioned close to the channel-portion end surface of the channel-type SHG device.

Width W and thickness T of the channel portion of the channel-type SHG device, deviation $\Delta X$ in the width direction between the center line of the semiconductor laser device and the center line of the channel portion of the channel-type SHG device, deviation $\Delta Z$ in the thickness direction, and distance $\Delta Y$ between the light-emitting portion end surface of the bare chip and the channel-portion end surface of the channel-type SHG device are desirably within the following ranges:

$$(W-2)\mu m/2 \leq \Delta X \leq (W-2)\mu m/2$$

$$0 \ \mu m \leq \Delta Y \leq 4 \ \mu m$$

$$T \ \mu m/2 \leq \Delta Z \leq T \ \mu m/2$$

The reason why this structure is desirable is that this structure eliminates the need for complex adjustment of laser light guiding, thereby achieving an easy-to-handle device.

The reason why the deviation $\Delta X$ in the width direction between the center line of the semiconductor laser device and the center line of the channel portion of the channel-type SHG device, the deviation $\Delta Z$ in the thickness direction, and the distance $\Delta Y$ between the light-emitting portion end surface of the bare chip and the channel-portion end surface of the channel-type SHG device are desirably within the above ranges is that a practical laser incident efficiency of over 50% is obtained within the above ranges.

The center line of the semiconductor laser bare chip refers to a straight line which is perpendicular to the light-emitting end surface (from which laser light is emitted) and halves both the width and thickness of the light-emitting portion of the semiconductor laser.

The center line of the channel-type waveguide is a straight line which is perpendicular to the channel-portion end surface and halves both the width and thickness of the channel portion.

The $\Delta X$ and $\Delta Z$ have either positive or negative values; defined as $\Delta X=0$ and $\Delta Z=0$ when the center line of the semiconductor laser bare chip exactly coincides with the center line of the channel portion of the channel-type waveguide, positive when deviated in a specific direction, and negative when deviated in the reverse of the specific direction.

It is desirable that $\Delta Y$ is zero, but, in view of the difficulty in processing and thermal expansion, it is preferably no smaller than 0.01 $\mu m$.

Width W and thickness T of the channel portion of the channel-type SHG device, deviation $\Delta X$ in the width direction between the center line of the semiconductor laser device and the center line of the channel portion of the channel-type SHG device, deviation $\Delta Z$ in the thickness direction, and distance $\Delta Y$ between the light-emitting portion end surface of the bare chip and the channel-portion end surface of the channel-type SHG device are preferably within the following ranges:

$$(W-2)\mu m/3 \leq \Delta X \leq (W-2)\mu m/3$$

$$0.05 \ \mu m \leq \Delta Y \leq 2 \ \mu m$$

$$T \ \mu m/3 \leq \Delta Z \leq T \ \mu m/3$$

more preferably, $$(W-2)\mu m/4 \leq \Delta X \leq (W-2)\mu m/4$$

$$0.1 \ \mu m \leq \Delta Y \leq 0.5 \ \mu m$$

$$T \ \mu m/4 \leq \Delta Z \leq T \ \mu m/4$$

It is desirable that the width W and the thickness T of the channel portion of the channel-type SHG device be respectively:

$$1 \ \mu m \leq W \leq 15 \ \mu m$$

$$0.2 \ \mu m \leq T \leq 6 \ \mu m$$

This is because, since the light-emitting portion of the semiconductor laser typically measures 1-2 $\mu m$ in width and 0.1-0.4 $\mu m$ in thickness, even higher incident efficiency can be obtained by using the channel-type waveguide within the above ranges.

The width W and the thickness T of the channel portion are preferably respectively within the ranges:

$$2 \ \mu m \leq W \leq 10 \ \mu m$$

$$0.4 \ \mu m \leq T \leq 4 \ \mu m$$

more preferably $$4 \ \mu m \leq W \leq 7 \ \mu m$$

$$1 \ \mu m \leq T \leq 2.5 \ \mu m$$

The block is preferably made of silicon.

This is because a silicon block has a thermal expansion coefficient close to that of the semiconductor laser bare chip, is thus resistant to heat cycles, and can be readily processed by chemical etching and the like.

The block and the channel-type SHG device are preferably bonded with an adhesive. Alternatively, the block and the substrate of the channel-type SHG device may be bonded through a fixing plate.

Furthermore, the SHG device bonded with the semiconductor laser bare chip is preferably enclosed in a package.

This is because, by enclosing in a package, resistance to mechanical shocks can be improved and the service life of the semiconductor laser can be extended.

The package is required to have a window through which second harmonic wave is outputted out of the package.

The window to output the second harmonic wave out of the package is desirably provided with a wavelength-selective filter.

The wavelength-selective filter refers to a wavelength-selective thin film or plate which completely or almost does not pass through the fundamental laser light.

This is because such a filter can remove unnecessary fundamental laser light from the output light and efficiently take out only the required second harmonic wave, while maintaining air-tight sealing.

Therefore, compared with a wavelength-selective filter provided on the upper or lower part of a conventional sealing window glass, the above configuration can provide a simplified process, a reduction in cost, and an improved transmittance of the second harmonic wave.

The method for producing the SHG device according to the present invention will now be described.

In the inventive method for producing a second harmonic wave generating device having a thin film waveguide layer formed on a substrate, after thin film is formed on the substrate, the thin film is dry etched to adjust the film thickness, whereby the thin film waveguide layer is formed which satisfies the following Equation (A) or (B):

$$\text{when } \frac{(n_{OF1} - n_{OS1})}{(n_{eF2} - n_{eS2})} > 2 \tag{A}$$

$$0.02 \leq \frac{(\lambda + 0.1) N_1}{\lambda^3 T} \leq 6.0$$

or $$\text{when } \frac{(n_{OF1} - n_{OS1})}{(n_{eF2} - n_{eS2})} \leq 2 \tag{B}$$

$$0.05 \leq \frac{(\lambda + 0.1) N_2}{\lambda^3 T} \leq 5.0$$

wherein,
- $T\ \mu m$: a thickness of the thin film waveguide layer
- $\lambda\ \mu m$: a fundamental laser wavelength
- $n_{OS1}$: an ordinary refractive index of the substrate at the fundamental wavelength ($\lambda\ \mu m$)
- $n_{OF1}$: an ordinary refractive index of the thin film waveguide layer at the fundamental wavelength ($\lambda\ \mu m$)
- $n_{eS2}$: an extraordinary refractive index of the substrate at a second harmonic wavelength ($\lambda\ \mu m/2$)
- $n_{eF2}$: an extraordinary refractive index of the thin film waveguide layer at the second harmonic wavelength ($\lambda\ \mu m/2$)

$N_1$ in Equation (A) is $$N_1 = \frac{(n_{eF2} - n_{eS2})}{(n_{OF1} - n_{eS2})}$$

and $N_2$ in Equation (B) is $$N_2 = \frac{(n_{eF2} - n_{eS2})}{(n_{OF1} - n_{OS1})}$$

This is because a SHG device having a thin film waveguide layer formed on a substrate is low in conversion efficiency to the second harmonic wave and thus is not practically usable unless the device has a structure which satisfies either Equation (A) or Equation (B).

In particular, in order to obtain a high conversion efficiency to the second harmonic wavelength, it is preferable that the film thickness be adjusted so as to form a thin film waveguide layer which satisfies either the following Equation (A′) or (B′), and it is particularly advantageous that the film thickness be adjusted so as to form a thin film waveguide layer which satisfies either Equation (A″) or Equation (B″):

$$\text{when } \frac{(n_{OF1} - n_{OS1})}{(n_{eF2} - n_{eS2})} > 2$$

$$0.1 \leq \frac{(\lambda + 0.1) N_1}{\lambda^3 T} \leq 3.0 \tag{A′}$$

$$0.2 \leq \frac{(\lambda + 0.1) N_1}{\lambda^3 T} \leq 1.2 \tag{A″}$$

wherein, $N_1$ in Equation (A′) and Equation (A″) above is $$N_1 = \frac{(n_{eF2} - n_{eS2})}{(n_{OF1} - n_{eS2})}$$

On the other hand, when $$\frac{(n_{OF1} - n_{OS1})}{(n_{eF2} - n_{eS2})} \leq 2$$

$$0.2 \leq \frac{(\lambda + 0.1) N_2}{\lambda^3 T} \leq 3.0 \tag{B′}$$

$$0.4 \leq \frac{(\lambda + 0.1) N_2}{\lambda^3 T} \leq 1.0 \tag{B″}$$

wherein, $N_2$ in Equation (B′) and Equation (B″) above is $$N_2 = \frac{(n_{eF2} - n_{eS2})}{(n_{OF1} - n_{OS1})}$$

In the above Equations,
- $T\ \mu m$: a thickness of the thin film waveguide layer
- $\lambda\ \mu m$: a fundamental laser wavelength
- $n_{OS1}$: an ordinary refractive index of the substrate at the fundamental wavelength ($\lambda\ \mu m$)
- $n_{OF1}$: an ordinary refractive index of the thin film waveguide layer at the fundamental wavelength ($\lambda\ \mu m$)
- $n_{eS2}$: an extraordinary refractive index of the substrate at a second harmonic wavelength ($\lambda\ \mu m/2$)
- $n_{eF2}$: an extraordinary refractive index of the thin film waveguide layer at the second harmonic wavelength ($\lambda\ \mu m/2$)

In the present invention, it is necessary to make the film thickness adjustment by dry etching.

This is because the dry etching technique has a good repeatability of etching rate and has a processing precision over the 1 $\mu m$ level.

Dry etching techniques include ion beam etching, plasma etching, and reactive ion beam etching, and the ion beam etching is particularly preferable.

The ion beam etching has a very high processing precision of approximately ±0.001 $\mu m$ and is thus a preferable processing method to adjust the thickness of the thin film waveguide layer to a desired value.

The ion beam etching not only is able to reduce the etching rate to 0.01 to 0.001 μm/hr, but also has a good repeatability and a uniform etching rate, and gives almost no damages to the material being processed.

It is particularly preferable that the processing precision of the film thickness (T μm) be ±0.01 to ±0.05 μm, and the ion beam etching is the most suitable as a processing method which allows such high-precision processing and does not deteriorate the optical characteristics of the thin film waveguide layer.

The dry etching is preferably followed by chemical etching.

This is because, when a complex oxide is dry etched, some atoms are readily ejected but others are not, resulting in atomic-level surface irregularities, which can be removed by chemical etching.

The thin film is desirably formed on the substrate by a sputtering or liquid phase epitaxial method, and use of a liquid phase epitaxial method is particularly preferable.

This is because a thin film formed by the liquid phase epitaxial method has a very good crystallinity.

The inventive thin film waveguide layer is desirably of a channel type, preferably with a width of 1 to 10 μm.

This is because this type of device can have a high optical power density over a slab type. The reason why a width of 1 to 10 μm is advantageous is that a width smaller than 1 μm is difficult to introduce incident light into the waveguide and low in incident efficiency, resulting in a low SHG conversion efficiency, and, although a larger width has a higher incident efficiency, a width greater than 10 μm is low in optical power density, resulting in a low SHG conversion efficiency.

The channel-type waveguide is preferably of a ridge type.

The SHG device production method according to the present invention can be applied to the manufacture of all types of SHG devices having a waveguide structure. However, in particular, a channel-type SHG device is advantageously produced by a method in which, after a thin film is formed on the substrate, the thickness of the thin film is adjusted, and an etching mask is formed, followed by dry etching, or, an etching mask is formed, followed by dry etching, and the etching mask is removed, followed by ion beam etching.

In the former case, it is preferable to adjust the thickness of the thin film by dry etching.

In the latter method, since a step can be formed by forming an etching mask and ion beam etching, the ratio of the film thickness to the step size is determined from microscopic observation, and the step size is measured by a step meter, thereby enabling film thickness measurement with a very high precision.

This method is advantageous to obtain the thin film waveguide layer with a thickness close to the desired value.

Heretofore, there has been available no instrument which enables direct and simple measurement of such a thin film, and the film thickness has been measured using a scale of a microscope. However, the scale of microscope involves errors and is thus difficult to perform precision measurement.

The above-described production method can eliminate such prior art problems.

A resin thin film or a Ti thin film is used as the etching mask, and the Ti thin film is particularly preferable.

This is because Ti can readily be formed into a uniform, smooth thin film by a conventional RF sputtering technique, with a good repeatability of film thickness, can be readily etched with a chemical etching solution which does not corrode conventional photolithographic resists, and has a low dry etching rate, thus can be stably used as a dry etching mask.

The Ti thin film is preferably formed as a waveguide pattern on the thin film wave guide layer by photolithography and RF sputtering.

For example, after a photosensitive mask is formed on the thin film waveguide layer, a portion other than the waveguide pattern is exposed and developed, a Ti film is formed my RF sputtering, then the photosensitive mask is removed, or, after a Ti thin film is formed on the thin film waveguide layer by RF sputtering, an etching resist is formed along the waveguide pattern, the Ti thin film is etched, and then the etching resist is removed.

In the present invention, after a thin film is formed on the substrate, the thin film is desirably subjected to optical polishing.

This is because, by optical polishing, the surface condition of the thin film formed is improved, eliminating a loss due to laser light scattering.

Furthermore, before adjusting the thickness of the optically polished thin film, the film is preferably dry etched to previously adjust the thickness close to the desired value.

This is to reduce the ratio of the required film thickness to the step size to a value as small as possible, in order to enhance the reliability of film thickness measurement.

In the present invention, the most preferable production method for a SHG device involves adjusting the thickness of the thin film waveguide layer formed on the substrate by dry etching to a value within 96.3 to 103.9% to the phase matching film thickness.

The reason why it is necessary to adjust the thickness of the thin film waveguide layer to a value within 96.3 to 103.9% to the phase matching film thickness is that the highest SHG conversion efficiency is obtained within the range.

The thickness of the thin film waveguide layer is preferably 98.2 to 102.0%, more preferably 99.2 to 100.8%, to the phase matching film thickness.

DESCRIPTION OF PREFERRED EMBODIMENTS

Figure 1:
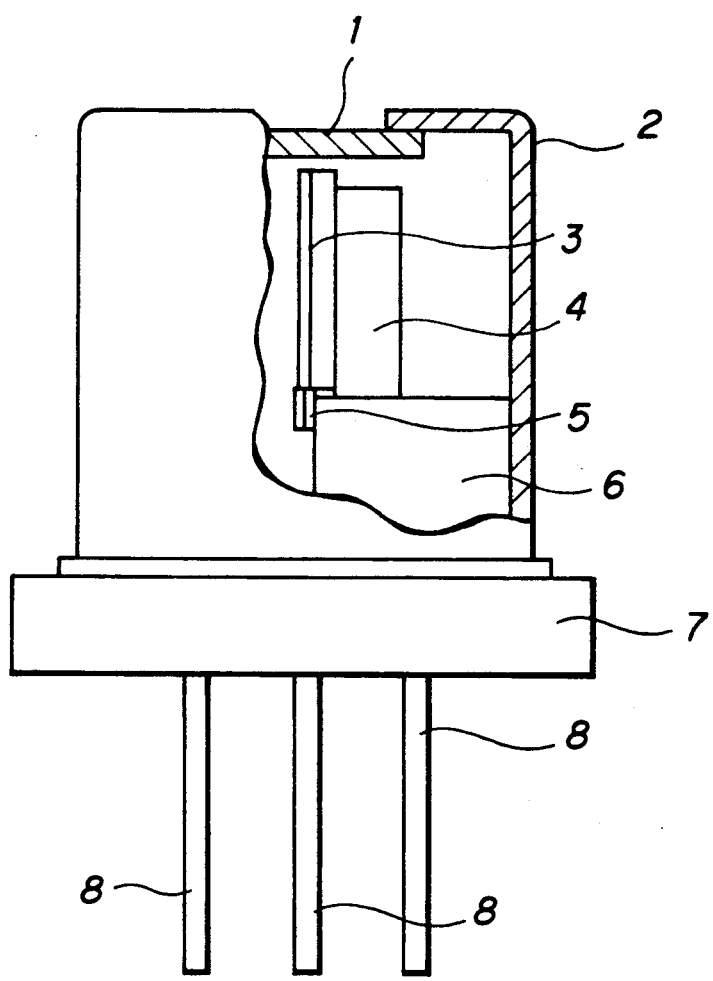
FIG. 1 is a schematic view of an air-tightly sealed package type device obtained in Example 12. In the drawing, numeral 1 denotes a wavelength selective thin film, numeral 2 denotes a sealing cap, numeral 3 denotes a SHG device, numeral 4 denotes a base, numeral 5 denotes a laser diode chip, numeral 6 denotes a heat sink, numeral 7 denotes a mount, and numeral 8 denotes a lead pin.

Examples of the present invention will now be described in detail.

EXAMPLE 1-1

For a fundamental wavelength ($\lambda$) of 0.83 μm, a LiNbO$_3$ single crystal thin film comprising a solid solution with 1 mole % each of Nd and Na having an ordinary refractive index ($n_{OF1}$) of 2.270 at the fundamental wavelength and an extraordinary refractive index ($n_{eF2}$) of 2.263 at the second harmonic wavelength was grown by a liquid phase epitaxial method to a thickness of 1.80 μm on a 0.5 mm thick X-cut LiTaO$_3$ single crystal substrate having an ordinary refractive index ($n_{OS1}$) of 2.151 at the fundamental wavelength and an extraordinary refractive index ($n_{eS2}$) of 2.261 at the second harmonic wavelength, and an optical device was fabricated using the thin film as a slab-type waveguide. Both end faces of the device were mirror-finished to allow transmission of light through the end faces, thus forming a SHG device. This SHG device corresponds to the case of $\{(\lambda+0.1)N_1/(\lambda^3 T)\}=0.2$.

To the SHG device, a 50 mW semiconductor laser of 0.83 μm in wavelength was applied with an incident angle of 90° with respect to the optical axis (Z-axis) of the Nd/Na-containing LiNbO$_3$ single crystal thin film. As a result, the SHG device exhibited a SHG conversion efficiency of 18.8%, showing that it is a SHG device with an extremely high SHG conversion efficiency.

EXAMPLE 1-2

Using the same procedure as in above Example 1-1, a SHG device was fabricated using a LiNbO$_3$ single crystal thin film having a thickness of 7.23 μm. This SHG device corresponds to the case of $\{(\lambda+0.1)N_1/(\lambda^3 T)\}=0.05$.

This SHG device was measured for the SHG conversion efficiency as in Example 1-1 and found to have a SHG conversion efficiency of 1.4%, showing that it is a SHG device with a sufficiently high SHG conversion efficiency.

EXAMPLE 1-3

Using the same procedure as in above Example 1-1, a SHG device was fabricated using a LiNbO$_3$ single crystal thin film having a thickness of 0.24 μm. This SHG device corresponds to the case of $\{(\lambda+0.1)N_1/(\lambda^3 T)\}=1.5$.

This SHG device was measured for the SHG conversion efficiency as in Example 1-1 and found to have a SHG conversion efficiency of 2.5%, showing that it is a SHG device with a sufficiently high SHG conversion efficiency.

EXAMPLE 1-4

An etching mask of 5.0 μm in width was formed using a photoresist film on the single crystal thin film of the SHG device obtained in Example 1-1, which was then ion beam-etched to fabricate a channel-type SHG device.

This SHG device was measured for the SHG conversion efficiency as in Example 1-1 and found to have a SHG conversion efficiency of 33.0%, showing that it is a SHG device with an extremely high SHG conversion efficiency.

EXAMPLE 2-1

For a fundamental wavelength (λ) of 0.83 μm, a LiNbO$_3$ single crystal thin film having an ordinary refractive index ($n_{OF1}$) of 2.253 at the fundamental wavelength and an extraordinary refractive index ($n_{eF2}$) of 2.249 at the second harmonic wavelength was grown by a RF sputtering method to a thickness of 3.15 μm on an Al$_2$O$_3$ single crystal substrate having an ordinary refractive index ($n_{OS1}$) of 1.759 at the fundamental wavelength and an extraordinary refractive index ($n_{eS2}$) of 1.779 at the second harmonic wavelength, and an optical device was fabricated using the thin film as a slab-type waveguide. Both end faces of the device were mirror-finished to allow transmission of light through the end faces, thus forming a SHG device. This SHG device corresponds to the case of $\{(\lambda+0.1)N_2/(\lambda^3 T)\}=0.5$.

To the SHG device, a 40 mW semiconductor laser of 0.83 μm in wavelength was applied with an incident angle of 90° with respect to the optical axis (Z-axis) of the LiNbO$_3$ single crystal thin film. As a result, the SHG device exhibited a SHG conversion efficiency of 12.2%, showing that it is a SHG device with an extremely high SHG conversion efficiency.

EXAMPLE 2-2

Using the same procedure as in above Example 2-1, a SHG device was fabricated using a LiNbO$_3$ single crystal thin film having a thickness of 0.45 μm. This SHG device corresponds to the case of $\{(\lambda+0.1)N_2/(\lambda^3 T)\}=3.5$.

This SHG device was measured for the SHG conversion efficiency as in Example 2-1 and found to have a SHG conversion efficiency of 1.7%, showing that it is a SHG device with a sufficiently high SHG conversion efficiency.

EXAMPLE 2-3

Using the same procedure as in above Example 2-1, a SHG device was fabricated using a LiNbO$_3$ single crystal thin film having a thickness of 8.74 μm. This SHG device corresponds to the case of $\{(\lambda+0.1)N_2/(\lambda^3 T)\}=0.18$.

This SHG device was measured for the SHG conversion efficiency as in Example 2-1 and found to have a SHG conversion efficiency of 1.2%, showing that it is a SHG device with a sufficiently high SHG conversion efficiency.

EXAMPLE 3-1

For a fundamental wavelength (λ) of 0.90 μm, a SBN25 (Sr$_{0.25}$Ba$_{0.75}$Nb$_2$O$_6$) thin film having an ordinary refractive index ($n_{OF1}$) of 2.250 at the fundamental wavelength and an extraordinary refractive index ($n_{eF2}$) of 2.225 at the second harmonic wavelength was grown by a RF sputtering method to a thickness of 2.29 μm on a NdGG (Nd$_3$Ga$_5$O$_{12}$) single crystal substrate having an ordinary refractive index ($n_{OS1}$) of 1.965 at the fundamental wavelength and an extraordinary refractive index ($n_{eS2}$) of 1.979 at the second harmonic wavelength, and an optical device was fabricated using the thin film as a slab-type waveguide. Both end faces of the device were mirror-finished to allow transmission of light through the end faces, thus forming a SHG device. This SHG device corresponds to the case of $\{(\lambda+0.1)N_2/(\lambda^3 T)\}=0.52$.

To the SHG device, a 50 mW semiconductor laser of 0.90 μm in wavelength was applied with an incident angle of 0° with respect to the optical axis (Z-axis) of the SBN thin film. As a result, the SHG device exhibited a SHG conversion efficiency of 17.8%, showing that it is a SHG device with an extremely high SHG conversion efficiency.

EXAMPLE 3-2

Using the same procedure as in above Example 3-1, a SHG device was fabricated using a SBN25 thin film having a thickness of 0.30 μm. This SHG device corresponds to the case of $\{(\lambda+0.1)N_2/(\lambda^3 T)\}=4.0$.

This SHG device was measured for the SHG conversion efficiency as in Example 3-1 and found to have a SHG conversion efficiency of 1.1%, showing that it is a SHG device with a sufficiently high SHG conversion efficiency.

EXAMPLE 3-3

Using the same procedure as in above Example 3-1, a SHG device was fabricated using a SBN25 thin film having a thickness of 3.95 μm. This SHG device corresponds to the case of $\{(\lambda+0.1)N_2/(\lambda^3 T)\}=0.3$.

This SHG device was measured for the SHG conversion efficiency as in Example 3-1 and found to have a SHG conversion efficiency of 4.5%, showing that it is a SHG device with a sufficiently high SHG conversion efficiency.

EXAMPLE 4-1

For a fundamental wavelength (λ) of 0.67 μm, a $KNbO_3$ single crystal thin film having an ordinary refractive index ($n_{OF1}$) of 2.320 at the fundamental wavelength and an extraordinary refractive index ($n_{eF2}$) of 2.319 at the second harmonic wavelength was grown by a liquid phase epitaxial method to a thickness of 4.10 μm on a KTP ($KTiOPO_4$) single crystal substrate having an ordinary refractive index ($n_{OS1}$) of 1.860 at the fundamental wavelength and an extraordinary refractive index ($n_{eS2}$) of 1.822 at the second harmonic wavelength, and an optical device was fabricated using the thin film as a slab-type waveguide. Both end faces of the device were mirror-finished to allow transmission of light through the end faces, thus forming a SHG device. This SHG device corresponds to the case of $\{(\lambda+0.1)N_2/(\lambda^3 T)\}=0.67$.

To the SHG device, a 5 mW semiconductor laser of 0.67 μm in wavelength was applied with an incident angle of 90°. As a result, the SHG device exhibited a SHG conversion efficiency of 13.8%, showing that it is a SHG device with an extremely high SHG conversion efficiency.

EXAMPLE 4-2

Using the same procedure as in above Example 4-1, a SHG device was fabricated using a $KNbO_3$ thin film having a thickness of 0.69 μm. This SHG device corresponds to the case of $\{(\lambda+0.1)N_2/(\lambda^3 T)\}=4.0$.

This SHG device was measured for the SHG conversion efficiency as in Example 3-1 and found to have a SHG conversion efficiency of 1.1%, showing that it is a SHG device with a sufficiently high SHG conversion efficiency.

EXAMPLE 4-3

Using the same procedure as in above Example 4-1, a SHG device was fabricated using a $KNbO_3$ thin film having a thickness of 9.18 μm. This SHG device corresponds to the case of $\{(\lambda+0.1)N_2/(\lambda^3 T)\}=0.3$.

This SHG device was measured for the SHG conversion efficiency as in Example 3-1 and found to have a SHG conversion efficiency of 1.2%, showing that it is a SHG device with a sufficiently high SHG conversion efficiency.

EXAMPLE 5-1

For a fundamental wavelength (λ) of 0.488 μm, a BBO (β-$BaBO_4$) thin film having an ordinary refractive index ($n_{OF1}$) of 2.262 at the fundamental wavelength and an extraordinary refractive index ($n_{eF2}$) of 2.256 at the second harmonic wavelength was grown by a RF sputtering method to a thickness of 5.24 μm on a LBO ($LiB_3O_5$) substrate having an ordinary refractive index ($n_{OS1}$) of 1.965 at the fundamental wavelength and an extraordinary refractive index ($n_{eS2}$) of 1.979 at the second harmonic wavelength, and an optical device was fabricated using the thin film as a slab-type waveguide. Both end faces of the device were mirror-finished to allow transmission of light through the end faces, thus forming a SHG device. This SHG device corresponds to the case of $\{(\lambda+0.1)N_2/(\lambda^3 T)\}=0.90$.

To the SHG device, a 100 mW Ar laser of 0.488 μm in wavelength was applied with an incident angle of 0° with respect to the optical axis (Z-axis) of the BBO thin film. As a result, the SHG device exhibited a SHG conversion efficiency of 33.4%, showing that it is a SHG device with an extremely high SHG conversion efficiency.

EXAMPLE 5-2

Using the same procedure as in above Example 5-1, a SHG device was fabricated using a BBO thin film having a thickness of 1.18 μm. This SHG device corresponds to the case of $\{(\lambda+0.1)N_2/(\lambda^3 T)\}=4.0$.

This SHG device was measured for the SHG conversion efficiency as in Example 5-1 and found to have a SHG conversion efficiency of 2.8%, showing that it is a SHG device with a sufficiently high SHG conversion efficiency.

EXAMPLE 5-3

Using the same procedure as in above Example 5-1, a SHG device was fabricated using a BBO thin film having a thickness of 15.73 μm. This SHG device corresponds to the case of $\{(\lambda+0.1)N_2/(\lambda^3 T)\}=0.3$.

This SHG device was measured for the SHG conversion efficiency as in Example 5-1 and found to have a SHG conversion efficiency of 2.2%, showing that it is a SHG device with a sufficiently high SHG conversion efficiency.

EXAMPLE 6

(1) For a fundamental wavelength (λ) of 0.83 μm, a $LiNbO_3$ single crystal thin film having an ordinary refractive index ($n_{OF1}$) of 2.264 at the fundamental wavelength and an extraordinary refractive index ($n_{eF2}$) of 2.263 at the second harmonic wavelength was grown by a liquid phase epitaxial method on a 0.5 mm thick Z-cut $LiTaO_3$ single crystal substrate having an ordinary refractive index ($n_{OS1}$) of 2.151 at the fundamental wavelength and an extraordinary refractive index ($n_{eS2}$) of 2.261 at the second harmonic wavelength, and the surface was mirror-finished to form a slab-type waveguide having the $LiNbO_3$ thin film as a waveguide layer.

(2) The thickness of the slab-type waveguide was adjusted by sputter-etching to 2.50 μm±0.05 μm.

(3) Both end surfaces of the slab-type waveguide obtained in (2) were mirror-finished by buffing to enable incidence and output of light by way of the surfaces, thus obtaining a second harmonic wave generating (SHG) device.

To the thus obtained SHG device according to the present invention, a 50 mW semiconductor laser of 0.83 μm in wavelength was applied with an incident angle of 90° with respect to the optical axis (Z-axis) of the $LiNbO_3$ single crystal thin film. As a result, the SHG device exhibited a SHG conversion efficiency of 6%, showing that it is a SHG device with an extremely high SHG conversion efficiency.

EXAMPLE 7

(1) A MgO thin film with a thickness of 500 angstroms was formed by RF sputtering on a 0.5 mm thick Z-cut LiTaO$_3$ single crystal substrate, and Mg was diffused by thermal diffusion into the surface layer of the LiTaO$_3$ single crystal. At a fundamental laser wavelength λ of 0.83 μm, the Mg-diffused LiTaO$_3$ substrate had an ordinary refractive index ($n_{OS1}$) of 2.153, and an extraordinary refractive index ($n_{eS2}$) of 2.272 at the second harmonic wavelength λ/2.

A LiNbO$_3$ single crystal thin film comprising a solid solution with 6 mole % each of Mg and Na having an ordinary refractive index ($n_{OF1}$) of 2.252 at a fundamental wavelength λ of 0.83 μm and an extraordinary refractive index ($n_{eF2}$) of 2.253 at the second harmonic wavelength was grown on top of the substrate by a liquid phase epitaxial method. The surface was mirror-finished to form a slab-type waveguide comprising the LiNbO$_3$ thin film as a waveguide layer.

(2) The thickness of the slab-type waveguide obtained in (1) was adjusted by ion beam etching to 5.06±0.05 μm.

(3) A Ti waveguide pattern was formed by photolithography and RF sputtering on the slab-type waveguide obtained in (1) and (2), which was ion beam etched using the pattern as an etching mask, the Ti etching mask was removed, and the waveguide was further ion beam etched to form a ridge-formed channel-type waveguide with a thickness of 10 μm, a thickness of 2.23±0.05 μm, and a step size of 1 μm.

(4) Both end surfaces of the channel-type waveguide obtained in (3) were mirror-finished by buffing to enable incidence and output of light by way of the surfaces, thus obtaining a second harmonic wave generating (SHG) device.

To the SHG device, a 40 mW semiconductor laser of 0.83 μm in wavelength was applied with an incident angle of 90° with respect to the optical axis (Z-axis) of the single crystal thin film. As a result, the SHG device exhibited a SHG conversion efficiency of 18.5%, showing that it is a SHG device with a very high SHG conversion efficiency.

EXAMPLE 8

(1) For a fundamental wavelength (λ) of 0.83 μm, a LiNbO$_3$ single crystal thin film comprising a solid solution with 1 mole % each of Nd and Na having an ordinary refractive index ($n_{OF1}$) of 2.270 at the fundamental wavelength and an extraordinary refractive index ($n_{eF2}$) of 2.263 at the second harmonic wavelength was grown by a liquid phase epitaxial method on a 0.5 mm thick X-cut LiTaO$_3$ single crystal substrate having an ordinary refractive index ($n_{OS1}$) of 2.151 at the fundamental wavelength and an extraordinary refractive index ($n_{eS2}$) of 2.261 at the second harmonic wavelength, and the surface was mirror-finished to form a slab-type waveguide using the thin film as the waveguide layer.

(2) The thickness of the slab-type waveguide obtained in (1) was adjusted by ion beam etching to 2.30±0.03 μm.

(3) The slab-type waveguide obtained in (1) and (2) was further processed as in (3) of Example 6 to form a ridge-formed channel-type waveguide with a thickness of 10 μm, a thickness of 2.30±0.03 μm, and a step size of 1 μm.

(4) Both end surfaces of the channel-type waveguide obtained in (1) were mirror-finished by buffing to enable incidence and output of light by way of the surfaces, thus obtaining a second harmonic wave generating (SHG) device.

To the SHG device, a 40 mW semiconductor laser of 0.83 μm in wavelength was applied with an incident angle of 90° with respect to the optical axis (Z-axis) of the single crystal thin film. As a result, the SHG device exhibited a SHG conversion efficiency of 25.6%, showing that it is a SHG device with a very high SHG conversion efficiency.

EXAMPLE 9

(1) A V$_2$O$_5$ thin film with a thickness of 1 μm was formed by RF sputtering on a 0.5 mm thick Y-cut LiTaO$_3$ single crystal substrate, and V was diffused by thermal diffusion into the surface layer of the LiTaO$_3$ single crystal. At a fundamental laser wavelength λ of 0.83 μm, the V-diffused LiTaO$_3$ substrate had an ordinary refractive index ($n_{OS1}$) of 2.153, and an extraordinary refractive index ($n_{eS2}$) of 2.272 at the second harmonic wavelength λ/2.

A LiNbO$_3$ single crystal thin film comprising a solid solution with Mg and Nd (5 mole % and 2 mole %, respectively) having an ordinary refractive index ($n_{OF1}$) of 2.281 at a fundamental wavelength λ of 0.83 μm and an extraordinary refractive index ($n_{eF2}$) of 2.276 at the second harmonic wavelength was grown on top of the substrate by a liquid phase epitaxial method. The surface was mirror-finished to form a slab-type waveguide comprising the Mg,Nd-containing LiNbO$_3$ thin film as a waveguide layer.

(2) The thickness of the slab-type waveguide obtained in (1) was adjusted by plasma etching to 2.13±0.04 μm.

(3) A Ti waveguide pattern was formed by photolithography and RF sputtering on the slab-type waveguide obtained in (1) and (2), which was plasma etched using the pattern as an etching mask to form a ridge-formed channel-type waveguide with a thickness of 10 μm, a thickness of 2.13±0.04 μm, and a step size of 1μm.

(4) Both end surfaces of the channel-type waveguide obtained in (3) were mirror-finished by buffing to enable incidence and output of light by way of the surfaces, thus obtaining a second harmonic wave generating (SHG) device.

To the SHG device, a 50 mW semiconductor laser of 0.83 μm in wavelength was applied with an incident angle of 90° with respect to the optical axis (Z-axis) of the single crystal thin film. As a result, the SHG device exhibited a SHG conversion efficiency of 23.1%, showing that it is a SHG device with a very high SHG conversion efficiency.

EXAMPLE 10

(1) A 5 μm thick ZnO thin film having an ordinary refractive index ($n_{oc}$) of 1.900 at the fundamental laser wavelength and an extraordinary refractive index ($n_{ec}$) of 1.900 at the second harmonic wavelength was formed by RF sputtering on the channel-type waveguide obtained in Example 8 to form a three-layered channel-type waveguide having the ZnO thin film as a clad layer.

(2) Both end surfaces of the channel-type waveguide was buff-polished to obtain a second harmonic wave generating (SHG) device.

To the thus obtained SHG device of the present invention, a 50 mW semiconductor laser of 0.83 μm in wavelength was applied with an incident angle of 90° with respect to the optical axis (Z-axis) of the LiNbO₃ single crystal thin film. As a result, the SHG device exhibited a SHG conversion efficiency of 17.3%, showing that it is a SHG device with an extremely high SHG conversion efficiency.

EXAMPLE 11

(1) A LiTaO₃ single crystal thin film with a thickness of 5 μm was formed by RF sputtering on a 0.5 mm thick optical-grade Z-cut LiNbO₃ single crystal substrate. At a fundamental laser wavelength λ of 0.83 μm, the thus obtained substrate had an ordinary refractive index ($n_{OS1}$) of 2.1511, and an extraordinary refractive index ($n_{eS2}$) of 2.2511 at the second harmonic wavelength λ/2.

(2) On top of the substrate obtained in (1), a LiNbO₃ single crystal thin film comprising a solid solution with Mg and Nd (5 mole % and 2 mole %, respectively) having an ordinary refractive index ($n_{OF1}$) of 2.281 at a fundamental wavelength λ of 0.83 μm and an extraordinary refractive index ($n_{eF2}$) of 2.276 at the second harmonic wavelength was grown by a liquid phase epitaxial method. The surface was mirror-finished to form a slab-type waveguide comprising the Mg,Nd-containing LiNbO₃ thin film as a waveguide layer.

(3) The thickness of the slab-type waveguide obtained in (2) was adjusted by plasma etching to 2.47±0.04 μm.

(4) A Ti waveguide pattern was formed by photolithography and RF sputtering on the slab-type waveguide obtained in (2) and (3), which was plasma etched using the pattern as an etching mask to form a ridge-formed channel-type waveguide with a thickness of 10 μm, a thickness of 2.47±0.04 μm, and a step size of 1 μm.

(5) Both end surfaces of the channel-type waveguide obtained in (4) were mirror-finished by buffing to enable incidence and output of light by way of the surfaces, thus obtaining a second harmonic wave generating (SHG) device.

To the SHG device, a 50 mW semiconductor laser of 0.83 μm in wavelength was applied with an incident angle of 90° with respect to the optical axis (Z-axis) of the single crystal thin film. As a result, the SHG device exhibited a SHG conversion efficiency of 29.2%, showing that it is a SHG device with a very high SHG conversion efficiency.

EXAMPLE 12

(1) One end surface of the channel-type waveguide of the SHG device obtained in Example 8 was precisely positioned in line with the light-emitting area of a semiconductor laser, and the semiconductor laser chip and the SHG device were fixed on a silicon block using an ultraviolet-curing resin.

Wires were bonded to the upper and lower surfaces of the semiconductor laser to enable supply of driving power.

(2) The thus integrated semiconductor laser and SHG device were placed in an air-tight sealed metal package as shown in FIG. 1, external pins and the wires were electrically connected to enable supply of operation power from the external pins, covered with a cap having a wavelength-selective glass window, and the inside was sealed with a high-purity nitrogen gas atmosphere.

To the thus formed air-tight sealed package-type SHG device according to the present invention, an operation power for an output of 48.0 mW from the semiconductor laser was applied. As a result, the second harmonic wave output from the glass window was 4.6 mW and the semiconductor laser output was 0.01 mW, thus efficiently retrieving the second harmonic wave.

As described above, the present invention can provide a SHG device of a thin film waveguide structure having an extremely high SHG conversion efficiency.

We claim:

1. A second harmonic wave generating device comprising a thin film waveguide layer formed on a substrate, characterized in that said thin film wave guide layer is formed by dry etching a thin film formed on said substrate to adjust the thickness of said thin film so as to satisfy the following Equation (A) or (B), $$\text{when } \frac{(n_{OF1} - n_{OS1})}{(n_{eF2} - n_{eS2})} > 2 \tag{A}$$

$$0.02 \leq \frac{(\lambda + 0.1) N_1}{\lambda^3 T} \leq 6.0$$

or $$\text{when } \frac{(n_{OF1} - n_{OS1})}{(n_{eF2} - n_{eS2})} \leq 2 \tag{B}$$

$$0.05 \leq \frac{(\lambda + 0.1) N_2}{\lambda^3 T} \leq 5.0$$

wherein,

T μm: a thickness of the thin film waveguide layer

λ μm: a fundamental laser wavelength $n_{OS1}$: an ordinary refractive index of the substrate at the fundamental wavelength (λ μm)

$n_{OF1}$: an ordinary refractive index of the thin film waveguide layer at the fundamental wavelength (λ μm)

$n_{eS2}$: an extraordinary refractive index of the substrate at a second harmonic wavelength (λ μm/2)

$n_{eF2}$: an extraordinary refractive index of the thin film waveguide layer at the second harmonic wavelength (λ μm/2)

$N_1$ in Equation (A) is $$N_1 = \frac{(n_{eF2} - n_{eS2})}{(n_{OF1} - n_{eS2})}$$

and $N_2$ in Equation (B) is $$N_2 = \frac{(n_{eF2} - n_{eS2})}{(n_{OF1} - n_{OS1})}$$

2. The second harmonic wave generating device of claim 1 wherein incident angle (θ) of the fundamental wave to the optical axis (Z-axis) of said thin film waveguide layer is 0°±15° or 90°±15°.

3. The second harmonic wave generating device of claim 1 wherein said dry etching is ion beam etching.

4. The second harmonic wave generating device of claim 1 wherein said dry etching is selected from the group consisting of plasma etching, reactive ion beam etching, and sputter-etching.

5. The second harmonic wave generating device of claim 1 wherein said thin film waveguide layer is a channel-type waveguide layer.

6. The second harmonic wave generating device of claim 5 wherein said channel-type waveguide layer is of a ridge type.

* * * * *